(12) United States Patent
Miller

(10) Patent No.: US 6,207,615 B1
(45) Date of Patent: Mar. 27, 2001

(54) LAWN FERTILIZER FOR CANINE WASTE DAMAGE

(75) Inventor: Timothy A. Miller, Andover, MN (US)

(73) Assignee: K9 Products, Inc., Coon Rapids, MN (US)

( * ) Notice: Subject to any disclaimer, the term of this patent is extended or adjusted under 35 U.S.C. 154(b) by 0 days.

(21) Appl. No.: 09/252,130

(22) Filed: Feb. 18, 1999

Related U.S. Application Data

(63) Continuation-in-part of application No. 08/739,750, filed on Oct. 29, 1996, now abandoned.

(51) Int. Cl.⁷ .......................... A01N 25/32; A01N 59/00; C05G 1/00
(52) U.S. Cl. .............................. 504/103; 504/188; 71/31; 71/32; 71/54; 71/63; 71/903
(58) Field of Search .................................. 71/31, 32, 54, 71/63, 903; 504/103, 188

(56) References Cited

U.S. PATENT DOCUMENTS

| | | | | |
|---|---|---|---|---|
| 4,863,108 | * | 9/1989 | Mitchell | 241/168 |
| 6,047,650 | * | 4/2000 | Taddei | 111/92 |

* cited by examiner

*Primary Examiner*—John Pak
(74) *Attorney, Agent, or Firm*—Hugh D. Jaeger

(57) ABSTRACT

A lawn fertilizer to minimize or negate canine waste damage consisting of nitrogen, phosphorus and potash. The dry fertilizer is sprinkled over the canine waste damage and is compounded depending upon the season to provide starter fertilizer, summer fertilizer, and winter fertilizer.

6 Claims, 1 Drawing Sheet

LAWN FERTILIZER FOR CANINE WASTE DAMAGE

CROSS REFERENCES TO CO-PENDING APPLICATIONS

This patent application is a continuation-in-part of Ser. No. 08/739,750 entitled "LAWN FERTILIZER FOR CANINE WASTE DAMAGE" filed on Oct. 29, 1996 now abandoned.

BACKGROUND OF THE INVENTION

1. Field of the Invention

The present invention is for a lawn fertilizer for canine waste damage, and more particularly, pertains to a lawn fertilizer for treating urine spots and feces spots in lawns caused by canine waste, such as small dogs, medium sized dogs, large dogs, and any other type of animal besides canines.

2. Description of the Prior Art

In the past, animal waste from urinating or defecating, such as from dogs, would burn lawn grass, leaving unsightly dead areas of grass.

The present invention overcomes the problems of prior art by providing a lawn fertilizer for the appropriate season for enhancing the growth of lawn turf, particularly grasses.

SUMMARY OF THE INVENTION

The general purpose of the present invention is to provide a lawn fertilizer for enhancing and continuing the growth of damaged turf areas caused by animal urine and animal feces, and particularly enhancing the growth of what is referred to as burn areas of the lawn.

According to one embodiment of the present invention, there is provided a fertilizer for reducing burn damage from canine waste to be applied to the lawn turf consisting of a combination of nitrogen, phosphorus and potash, and may also include gypsum. Also, when used on a regular basis, the fertilizer prevents damage from pet waste. The turf maintenance system reduces burn spots and restores burn spots.

In another embodiment of the present invention, there is provided a fertilizer for application to turf grass to prevent or rectify turf damage from a canine waste deposition. The fertilizer may have from about 6 wt % to about 8 wt % of nitrogen, from about 4 wt % to about 6 wt % of phosphorus, as $P_2O_5$, and about 4 wt % to about 6 wt % of potassium, as $K_2O$, about 60 wt % to about 68 wt % gypsum, and from about 2 wt % to about 6 wt % of limestone. The preferred fertilizer has a Guaranteed Analysis of 7-5-5 and includes about 64 wt % gypsum, and about 5 wt % limestone. The particle sizing of the component mixture is 10-14 Tyler screen or alternatively 10-16 Tyler screen. The preferred fertilizer of this embodiment may be formed by preparing a mixture of about 10.85 wt % Diammonium Phosphate; about 4.05 wt % Muriate of Potash; about 5.00 wt % Sulfate of Potash; about 10.95 wt % Urea; about 64 wt % Gypsum; and the balance of about 5.15 wt % limestone. Preferably, the particles are lightly sprayed with oil to improved physical durability during handling.

Significant aspects and features of the present invention include a fertilizer which will provide a turf maintenance system of a mix of nitrogen, phosphate, soluble potash, gypsum and limestone.

Another significant aspect and feature of the present invention is a dry fertilizer which can be spread by hand or by a spreader over burn areas of the yard caused by animal wastes, such as dog urine or dog feces, and minimize or eliminate the notorious brown spots caused by the pet.

Having thus described embodiments of the present invention, it is the principal object of the present invention to provide a canine turf maintenance system for lawns.

LAWN FERTILIZER FOR CANINE WASTE DAMAGE

PARTS LIST

10 canine turf maintenance system dry fertilizer
12 hand
14 burn spot
16 burn spot
18 grass

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
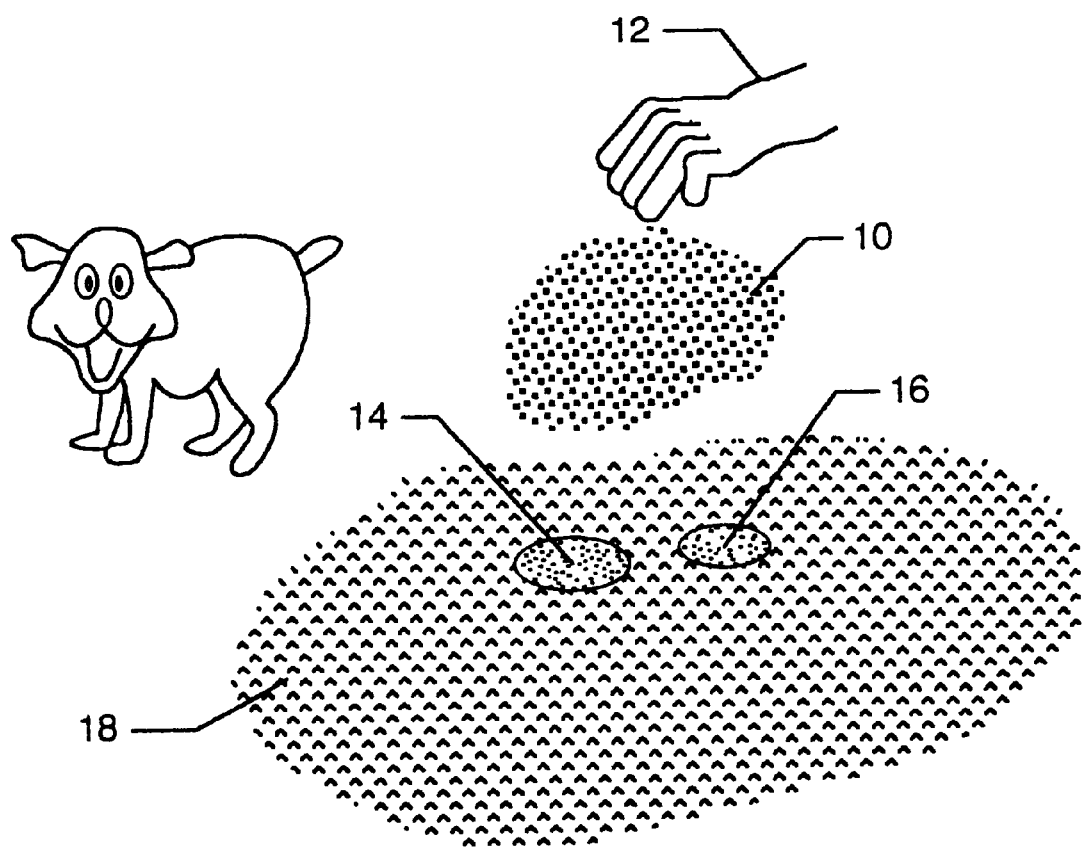
FIG. 1 illustrates an application of the canine turf maintenance system in a dry fertilizer form to burn spots in a yard, the present invention.

FIG. 1 illustrates the application of a canine turf maintenance system dry fertilizer 10 being spread by the hand 12 of a person onto burn spots 14 and 16 on grass 18 for either minimizing or eliminating the burn spot.

The dry fertilizer can consist of the following:

1. Starter/Spring—10 lb. 18-22-6 +20 lb. Ca2So4 (encapsulated gypsum) 18+1–4%, 22+1–4%, 6+1–2%; fertilizer at broad range: 14–22% nitrogen, 18–26% phosphorus, 48% potash; at narrow range: 16–20% nitrogen, 20–24% phosphorus, 5–7% potash.

2. Summer—10 lb. 26-3-3 +20 lb. Ca2So4 (encapsulated gypsum) 26+/-2%, 3+1–2%, 3+1–2%; fertilizer at broad range: 24–28% nitrogen, 1–5% phosphorus, 1–5% potash; at narrow range: 25–27% nitrogen, 2–4% phosphorus, 2–4% potash.

3. Winterizer—10 lb. 12-12-12 +20 lb. Ca2So4 (encapsulated gypsum) 12+1–2%, 12+1–2%, 12+1–2%; fertilizer at broad range: 10–14% nitrogen, 10–14% phosphorus, 10–14% potash; at narrow range: 11–13% nitrogen, 11–13% phosphorus, 11–13% potash.

In another embodiment of the present invention, there is provided a fertilizer for application to turf grass to prevent or rectify turf damage from a canine waste deposition. The fertilizer of this embodiment has a Guaranteed Analysis, with respect to nitrogen content, of about 6 wt % to about 8 wt %, preferably about 7 wt %; with respect to phosphorus content, expressed as the wt % of $P_2O_5$, of from about 4 wt % to about 6 wt %, preferably about 5 wt % expressed as $P_2O_5$; and from about 4 wt % to about 6 wt % of potassium, expressed as $K_2O$ content, preferably about 5 wt % $K_2O$; from about 60 wt % to about 68 wt % gypsum, preferably about 64 wt % gypsum; and about 2 wt % to about 6 wt % limestone, preferably about 5 wt % limestone. Preferably, the components are provided as particles and the particles are about 10-14 Tyler mesh screen or alternatively about 10-16 Tyler mesh screen in particle sizing. The preferred fertilizer has a Guaranteed Analysis of 7-5-5 and includes about 64 wt % gypsum and about 5 wt % limestone. The particle sizing of the component mixture is 10-14 Tyler screen or alternatively 10-16 Tyler screen. The fertilizer of this embodiment contains a mixture of particles; wherein the particles of Diammonium Phosphate are about 10.85 wt % of the mixture; particles of Muriate of Potash are about 4.05 wt % of the mixture; particles of Sulfate of Potash are about 5.00 wt % of the mixture; particles of Urea are about 10.95 wt % of the mixture; particles of Gypsum are about 64 wt % of the mixture; and particles of limestone, are the balance, i.e. about 5.15 wt %, of the mixture. Preferably, the particles are lightly sprayed with oil to improve physical durability during handling. The fertilizer of this invention also may be applied to a turf area subject to potential canine waste deposition to prevent or minimize damage should a canine waste deposition event occur.

EXAMPLE

A fertilizer of this embodiment was prepared by adding about 868 lbs. of Diammonium Phosphate particles of 10-14 Tyler screen size; about 324 lbs. of Muriate of Potash particles of 10-14 Tyler screen size; about 400 lbs. of Sulfate of Potash of 10-14 Tyler screen size; about 876 lbs. of Urea particles of 10-14 Tyler screen size; about 5120 lbs. of Gypsum particles of 10-14 Tyler screen size; and about 411 lbs. of Limestone particles of 10-14 Tyler screen size to a blender. The particles were mixed and sprayed with a light coating of oil and then mixture was placed in 30 lbs bags.

The preferred fertilizer of the present invention, according to the above example, was tested on turf grass which was exposed to canine deposits by applying at a rate of about 30 pounds per 2500 square feet. The turf grass had little or no effect from the canine deposits, whereas similar turf grass, which did not receive an application of the fertilizer, developed visible brown patches at the sites of deposition. The treated turf grass also remained quite resistant to subsequent canine deposits.

In another test, the preferred fertilizer of the present invention was compared to control test plots receiving only gypsum or only 7-5-5 type fertilizer (which fertilizer lacked the gypsum of the present invention). The beneficial effect of the present invention most notably observed on bluegrass species, was distinguishable from the control test plots. specifically, minimal burning was observed on bluegrass and the main effect of canine urine was a fertilizer effect. This is, the bluegrass was greener in the canine urine treated areas than in the untreated areas. The color contrast between canine urine treated and untreated areas was less when the fertilizer of this invention was used. Moreover, the bluegrass did not burn in response to the fertilizer of this invention and affected areas came back without the necessity of reseeding.

MODE OF OPERATION

The process of reducing the burned spots in a lawn turf include applying a product comprising a dry mixture of about two (2) parts of encapsulated gypsum and one (1) part granulated seasonally appropriate slow release lawn turn fertilizer, such as two (2) parts Kelley's encapsulated gypsum and one (1) part slow release lawn fertilizer.

The applications can be repeated at an interval of from 3 to 5 weeks.

The product is applied at a rate of from about 15 pounds per 2500 square feet to about 45 pounds per 2500 square feet. Preferably, the application rate is about 30 pounds per 3000 square feet.

Alternatively, the product is applied immediately adjacent, about or onto a recent area of canine waste deposition at a rate from about ¼ cup per square foot to about ¾ cup per square foot.

The application of product is to dry lawn turf. A light intermittent stream of water can be applied to substantially carry the product through the leaves of the lawn turf and onto the surface of the soil.

In another embodiment, the present invention is a method for preventing or rectifying turf damage from a canine waste deposition. By turf damage from canine waste herein is meant an area of turf at or adjacent to a deposit of canine waste, such as canine feces or canine urine, which is discolored relative to the surrounding green turf. Typically, turf damaged by a canine waste deposit is discolored to a light brown and provides a striking visual contrast with adjoining non-damaged green turf. Application of fertilizer, according to this embodiment, prevents and/or rectifies turf damage from canine waste. The fertilizer is prepared from a dry mixture of about 10.85 weight percent of Diammonium Phosphate particles (10-14 Tyler), about 4.05 weight percent Muriate of Potash particles (10-14 Tyler), about 5.0 weight percent Sulfate of Potash particles (10-14 Tyler), about 10.95 weight percent Urea particles (10-14 Tyler), about 64 weight percent Gypsum particles (10-14 Tyler), and the balance, about 5.15 weight percent, limestone particles (10-14 Tyler). Alternatively the particles of the mixture may be 10-16 Tyler screen. If the particles are not uniform, there is an undesirable tendency for the fertilizer to segregate during shipping, handling, or application. Preferably, the particle size of the Gypsum component available for mixing typically determines the particle size of the other components. For example, if the Gypsum component is 10-14 Tyler screen in particle size, then the Diammonium Phosphate, Muriate of Potash, Sulfate of Potash, limestone and Urea components should also be of 10-14 Tyler screen in particle size. Alternatively, if the Gypsum component is 10-16 Tyler screen in particle size, then the Diammonium Phosphate, Muriate of Potash, Sulfate of Potash, limestone and Urea components should also be of 10-16 Tyler screen in particle size. The fertilizer, whether of 10-14 Tyler screen particle size or of the alternative 10-16 Tyler screen particle size has a Guaranteed Analysis of 7-5-5 (which indicates the $N-P_2O_5-K_2O$ content of a fertilizer.) The method includes the step of applying the above-described fertilizer to the area immediately adjacent, about or onto a recent area of canine waste deposition. Preferably, the fertilizer is applied at a rate of from about ¼ cup per square foot to about ¾ cup per square foot. Alternatively, the fertilizer is preferably applied at a rate of from about 15 pounds per 2500 square feet to about 45 pounds per 2500 square feet. Most preferably, the application rate is about 30 pounds per 3000 square feet. The application of the fertilizer is preferably to dry lawn turf. Optionally, but most preferably, the area of fertilizer application is subjected to an application of a light intermittent stream of water to substantially carry the component particles of the fertilizer mixture downward through the leaves of the lawn turf and onto the surface of the soil. Preferably, the application is repeated at an interval of from 4 to 6 weeks after the previous application.

In another embodiment, the present invention is a method for protecting a turf area from turf damage from a potential canine waste deposition event. The method includes the step of applying to the turf area to be protected from turf damage due to potential canine waste deposition, prior to deposition of canine waste, a fertilizer according to the above description. The fertilizer is applied to the turf area to be protected, i.e., an area of turf where potential deposition of canine waste is anticipated. Preferably, the fertilizer is applied at a rate of from about 15 pounds per 2500 square feet to about 45 pounds per 2500 square feet. Most preferably, the application rate is about 30 pounds per 3000 square feet of turf. The application of the the fertilizer is preferably to dry lawn turf. Optionally, but most preferably, the area of fertilizer application is subjected to an application of a light intermittent stream of water to substantially carry the component particles of the fertilizer mixture downward through the leaves of the lawn turf and onto the surface of the soil. Preferably, the application is repeated at an interval of from 4 to 6 weeks.

Various modifications can be made to the present invention without departing from the apparent scope hereof.

It is claimed:

1. A method of reducing or rectifying turf damage from a canine waste deposition, comprising the step of applying a fertilizer of NPK 7-5-5 and including about 64 wt % gypsum particles and about 5 wt % limestone particles adjacent to or on an area of canine waste deposition.

2. The method of claim 1, further comprising the step of irrigating the area.

3. The method of claim 1, further comprising the step of reapplying a fertilizer of NPK 7-5-5 and including about 64 wt % gypsum particles and about 5 wt % limestone particles adjacent to or on an area of canine waste deposition about 4 to 6 weeks subsequent to the step of applying.

4. A method of reducing or rectifying turf damage in an area subject to potential canine waste deposition, comprising the step of applying a fertilizer of NPK 7-5-5 and including about 64 wt % gypsum particles and about 5 wt % limestone particles adjacent to or on the area of potential canine waste deposition.

5. The method of claim 4, further comprising the step of irrigating the area subsequent to the step of applying.

6. The method of claim 4 and further comprising the step of reapplying a fertilizer of NPK 7-5-5 and including about 64 wt % gypsum particles and about 5 wt % limestone particles adjacent to or on an area of canine waste deposition about 4 to 6 weeks subsequent to the step of applying.

* * * * *